United States Patent
Lambert

[15] 3,638,486
[45] Feb. 1, 1972

[54] VALVE SPRING TESTER

[72] Inventor: James H. Lambert, Dallas, Tex.

[73] Assignee: Frank L. Kehr, Dallas, Tex.

[22] Filed: Apr. 26, 1968

[21] Appl. No.: 724,522

[52] U.S. Cl. .................................................. 73/161
[51] Int. Cl. ................................................ G01l 1/04
[58] Field of Search ........................... 73/161, 119 R

[56] References Cited

UNITED STATES PATENTS

| | | | |
|---|---|---|---|
| 2,088,372 | 7/1937 | Gogan | 73/161 |
| 2,340,277 | 1/1944 | Sturtevant | 73/161 |
| 2,417,196 | 3/1947 | Hartley et al. | 73/161 |
| 2,706,404 | 4/1955 | Schiesel | 73/161 X |
| 2,708,364 | 5/1955 | Dack | 73/161 |
| 2,920,482 | 1/1960 | Droke | 73/161 |
| 3,335,604 | 8/1967 | Lyell | 73/161 |

FOREIGN PATENTS OR APPLICATIONS

| | | | |
|---|---|---|---|
| 210,571 | 10/1957 | Australia | 73/161 |

*Primary Examiner*—Louis R. Prince
*Assistant Examiner*—Denis E. Corr
*Attorney*—Howard E. Moore

[57] ABSTRACT

A device for testing the strength of a spring at a predetermined installed height comprising a movable cylinder having a pressure gauge secured thereto and a piston slidably disposed in the cylinder such that force exerted on the piston is registered on the gauge. An adjustable height limiter is secured to the device so that the force exerted by a spring being tested, when compressed to the height set on the limiter, is registered on the gauge.

3 Claims, 4 Drawing Figures

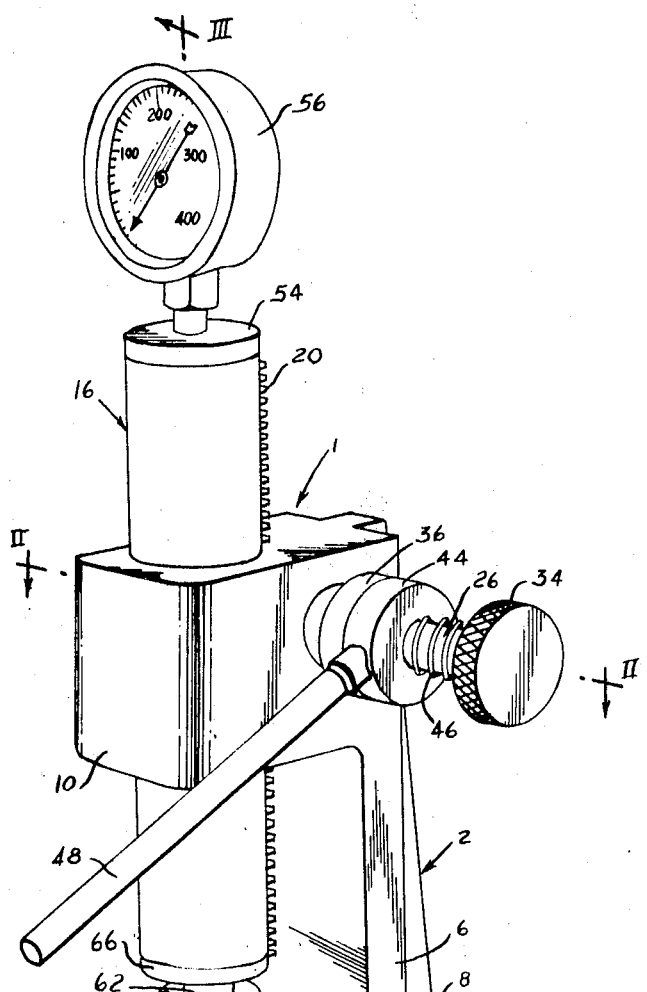
Fig. I
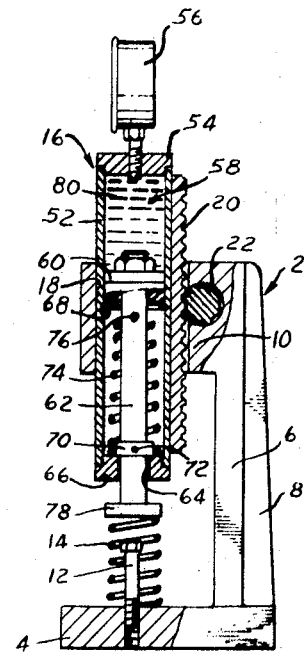
Fig. III
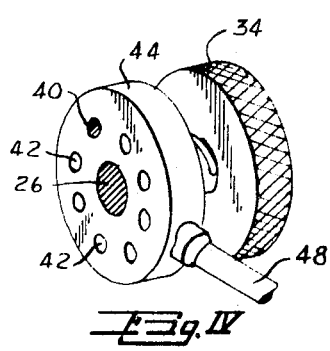
Fig. IV
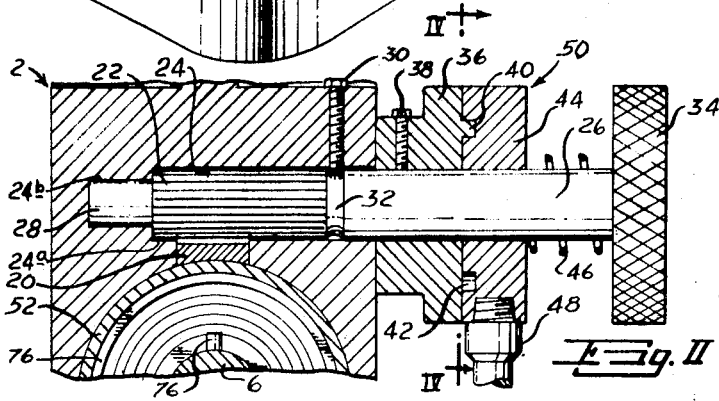
Fig. II
JAMES H. LAMBERT
INVENTOR.
BY Howard E. Moore
ATTORNEY

VALVE SPRING TESTER

BACKGROUND OF INVENTION

A spiral spring consists of a wire or rod of spring material formed by winding it about a mandrel to form a helix and is primarily intended for axial compression or tension loads.

The valve spring in an internal combustion engine has repeated compressive forces applied thereto tending to rotate the wire, thereby causing torsional, bending, direct compression and direct shearing stresses in the wire.

Repetitious loading of a spring results in fatigue, thereby reducing the strength and stiffness of the spring.

The valve spring must exert a predetermined force for a given deflection commonly referred to by automobile mechanics as the "installed height."

In repairing an automobile engine a mechanic refers to a repair manual or catalog for determining the force or spring loading of valves in the engine. This information is generally tabulated giving the specification for a spring, for example, as 117 pounds at an installed height of 1 19/32-inch.

The mechanic is faced with the problem of determining whether or not a particular valve spring meets the recommended specification.

SUMMARY OF THE INVENTION

I have developed a device for testing the stiffness of springs wherein the installed height may be preset allowing the force exerted by the spring at the installed height to be quickly and easily determined by reading a gauge.

It is therefore the primary object of the invention to provide a device for testing valve springs which indicates the spring pressure at installed height.

Another object of the invention is to provide a device for testing springs which is inexpensive and is economically feasible for use in small automobile repair shops.

Another object of the present invention is to provide a device for testing springs wherein a spring may be tested quickly and easily without extensive training of the operator.

Other and further objects of the invention will become apparent upon reading the detailed specification hereinafter following and by referring to the drawings annexed hereto.

DESCRIPTION OF THE DRAWING

The accompanying drawings of a preferred embodiment of the present invention are provided so that the invention may be better and more fully understood, in which:

FIG. I is a perspective view of the spring tester,

FIG. II is a cross-sectional view taken along lines II—II of FIG. I,

FIG. III is a cross-sectional view taken along lines III—III of FIG. I illustrating details of construction of the hydraulic cylinder incorporated in the invention, and FIG. IV is a perspective view of a section of a clutch taken along lines IV—IV of FIG. II.

Numeral references are employed to indicate the various parts shown in the drawing and like numerals indicate like parts throughout the various figures of the drawings.

DESCRIPTION OF A PREFERRED EMBODIMENT

Referring to FIG. I of the drawing the numeral 1 generally designates the spring tester having a pedestal 2 consisting of table 4, standard 6, angle brace 8 and arm 10. Pedestal 2 may be constructed by welding or otherwise rigidly connecting the components thereof. However, I contemplate casting the pedestal 2 as a single unit.

An adjustable spring contraction limiting member 12 which similates the installed height of a valve is adjustably secured to a central portion of table 4 wherein the installed height of a spring 14 positioned around limiter 12 may be measured from the surface of table 4 to the top of limiter 12. In the embodiment shown in the drawing installed height limiter 12 is illustrated as a bolt threadedly engaging table 4. Installed height may be adjusted by rotating the bolt or height limiter 12 thereby changing the distance between the top of the limiter 12 and table 4.

A hydraulic cylinder 16 is moveably secured in bore 18 extending through arm 10 in axial alignment with installed height limiter 12.

Cylinder 16 has a rack 20 rigidly connected to one side thereof engaging pinion 22 rotatably journaled in pedestal 2.

As best seen in FIG. II of the drawing, pedestal 2 has a stepped borehole 24 therein for receiving actuator shaft 26. Actuator shaft 26 has a splined portion forming pinion 22 having a diameter slightly less than that of the enlarged portion 24a of borehole 24. Shaft 26 has a reduced portion 28 forming a journal in the reduced portion 24b of bore 24. Setscrew 30 extends through pedestal 2 into bore 24 to engage annular groove 32 in actuator shaft 26 to prevent axial movement of said actuator shaft relative to pedestal 2.

A knob 34 is rigidly secured to actuator shaft 26 on the opposite end thereof from journal 28. Preferably knob 34 is knurled to facilitate rotation thereof.

A collar 36, rigidly connected to actuator shaft 26 by setscrew 38, has a pin 40 extending outwardly from one face thereof to engage spaced annular sockets 42 formed in the face of socket collar 44. Compression spring 46, mounted on actuator shaft 26, urges socket collar 44 toward collar 36 which results in positive engagement of pin 40 with socket 42.

A handle 48 is rigidly secured to socket collar 44 to facilitate rotation thereof.

As best seen in FIG. IV of the drawing socket collar 44 has a plurality of recesses 42 in the face thereof while collar 36 has one pin 40 extending outwardly therefrom. Collar 36 and socket collar 44 forms a pin clutch 50, allowing socket collar 44 to be moved outwardly against the tension of spring 46 to disengage pin 40 from socket 42 allowing handle 48 to be rotated without rotating actuator shaft 26.

From the foregoing it should be readily apparent that knob 34 may be utilized for lowering cylinder 16 toward spring 14 while allowing handle 48 to be adjusted to a position for applying force to urge ram 16 toward spring 14.

Pin clutch 50, consisting of collar 34 and socket collar 44 offers convenience and ease of operation and allows use of a long handle 48 for attaining leverage when springs exerting greater forces are being tested.

Cylinder 16 (FIG. III) consists of a cylindrical casing 52 closed at its upper end by cap 54, which is threadedly secured to said casing. A pressure gauge 56 is mounted on cap 54 and is arranged to communicate with reservoir 58 defined by the space enclosed inside casing 52.

The piston 60 is slideably disposed in reservoir 58 having piston rod 62 extending downwardly therefrom through opening 64 in cap 66 which threadedly engages the lower end of casing 52. Downward movement of piston 60 is limited by a plate 68 having an opening therethrough, through which piston rod 62 may extend and engage the lower surface of piston 60. Plate 68 is rigidly secured to wall of casing 52, being retained in annular recesses formed in the wall of casing 52.

The collar 70 is rigidly connected to rod 62 by a setscrew 72. Collar 70 is adapted to contact cap 66 when piston 60 and rod 62 are in the fully extended position.

A spring 74 is mounted about piston rod 62 the lower end thereof contacting cap 66 while the upper end thereof engages spring stop 76 consisting of a pin extending through rod 62 immediately below piston 60.

A pressure plate 78 is rigidly connected to the lower end of rod 62, forming a pad for engaging the upper end of spring 14.

Reservoir 58, defined by the space inside casing 52 between cap 54 and piston 60 is filled with a noncompressible hydraulic fluid 80.

The operation and function of the device hereinbefore described is as follows:

The installed height limiter 12 is adjusted to a position wherein the upper end of limiter 12 is a predetermined distance from the upper surface of table 4.

Spring 14 is positioned on table 4 around limiter 12 as illustrated in FIG. I of the drawing.

Socket plate 44 may be moved against the tension of spring 46, thereby disengaging pin 40 from recesses 42 in socket 44 allowing actuator shaft 26 to be rotated by turning knob 34. Rotation of actuator shaft 46 imparts rotation to pinion 22 which meshes with rack 20 rigidly secured to casing 52 of cylinder 16. Rotation of pinion 22 causes cylinder 16 to be moved axially relative to arm 10 and table 4. Cylinder 16 is lowered by rotation of knob 34 until pressure plate 78 on piston rod 62 is in contact with the upper end of spring 14.

After cylinder 16 has been positioned over spring 14, socket 44 is moved toward collar 36 engaging pin 40 in the selected recess 42 wherein handle 48 will be positioned so that a downward force on handle 48 will urge cylinder 16 toward spring 14, thereby causing said spring to be compressed to the predetermined installed height which was preset on limiter 12.

The force exerted by spring 14 is transmitted through pressure plate 78 and piston rod 62 to piston 60 and finally to hydraulic fluid 80. Pressure gauge 56 is calibrated to indicate pounds of force applied to piston rod 62.

In instances in which it is not deemed feasible to use a gauge 56 calibrated to indicate the force applied to piston 62 in the desired units such as pounds, a conversion table or chart may be utilized for converting the gauge pressure to the desired units.

When plate 78 contacts installed height limiter 12, the force required to compress spring to the preset installed height may be read on the gauge 56.

When the force required to compress spring 14 to its installed height has been determined, this data can be compared with specifications from appropriate repair manuals to determine whether or not the spring is still serviceable or needs replacing.

From the foregoing it should be readily apparent that I have developed a novel spring testing device which provides valuable test data simply and expeditiously. The testing device which I have developed is very simple to construct making the device economically feasible for use in small automotive repair shops.

It will be understood that other and further embodiments of my invention may be made.

Having described my invention, I claim:

1. In a device for testing springs; a pedestal having an arm and a table; a height limiter member adjustably secured to the table; a cylinder slidably disposed through the arm, having a movable piston therein, the walls of the cylinder and the piston defining a reservoir for hydraulic fluid; hydraulic fluid in the reservoir; a pressure gauge communicating with said reservoir; a rod attached to the piston extending through the end of the cylinder arranged to engage a spiral spring disposed about the height limiter and resting on the table; a shaft rotatably extending into a transverse bore in the pedestal; a pinion gear on said shaft, within the bore; a rack gear secured to the cylinder in mesh with the gear on the shaft; a collar rigidly connected to the shaft; a pin extending outwardly from the face of the collar; a socket collar rotatably journaled on the shaft; spaced annular sockets in the face of said socket collar adapted to receive the pin; a handle secured to the socket collar; resilient means on said shaft arranged to urge the socket collar toward the first named collar to engage the pin in a selected socket.

2. The combination called for in claim 1 wherein the resilient means is a spiral spring arranged about the shaft.

3. The combination called for in claim 2 with the addition of a knob on the shaft for rotating the shaft to move the cylinder toward or away from the spring to be tested while the pin on the first named collar is disengaged from a socket in the socket collar.

* * * * *